United States Patent [19]
Brusky et al.

[11] Patent Number: 5,954,805
[45] Date of Patent: Sep. 21, 1999

[54] AUTO RUN APPARATUS, AND ASSOCIATED METHOD, FOR A CONVERGENT DEVICE

[75] Inventors: Kevin J. Brusky, Magnolia; Derrill L. Sturgeon, Houston, both of Tex.

[73] Assignee: Compaq Computer Corporation, Houston, Tex.

[21] Appl. No.: 08/828,524

[22] Filed: Mar. 31, 1997

[51] Int. Cl.[6] .................................................. G06F 13/14
[52] U.S. Cl. ............................ 710/36; 710/36; 710/37; 710/38; 710/64
[58] Field of Search ..................................... 395/821–894

[56] References Cited

U.S. PATENT DOCUMENTS

| 4,628,541 | 12/1986 | Beavers | 359/142 |
|---|---|---|---|
| 4,658,247 | 4/1987 | Gharachorloo | 345/196 |
| 4,775,928 | 10/1988 | Kendall et al. | 708/563 |
| 4,954,819 | 9/1990 | Watkins | 345/340 |
| 5,270,989 | 12/1993 | Kimura | 369/37 |
| 5,291,275 | 3/1994 | Lumelsky | 348/441 |
| 5,451,981 | 9/1995 | Drako et al. | 345/118 |
| 5,488,393 | 1/1996 | Wood et al. | 345/213 |
| 5,502,462 | 3/1996 | Mical et al. | 345/507 |
| 5,543,824 | 8/1996 | Priem et al. | 345/508 |
| 5,572,698 | 11/1996 | Yen et al. | 711/110 |
| 5,610,663 | 3/1997 | Nan et al. | 348/554 |
| 5,819,156 | 10/1998 | Belmont | 455/2 |

OTHER PUBLICATIONS

Sheile, Teri, "Windows 95 Apllication Setup Guidelines For Independent Software Vendors", http://www.microsoft.com/win32dev/guidelins/setup.htm, May 1995.

"Control Autoplay (dynamically) from your program", wysiwyg://43/http://www.chami.com/tips/de3lphi/122896D.html, Dec. 1996.

"Disable Autoplay for Audio CDs", http://www.creaf.com/wwwnew/tech/faqs/cd0012.html, Dec. 1996.

Application Note/AN177; "An overview of the phase-locked loop (PLL)"; Philips Semiconductors; Dec. 1988; pp. 1–6.

Application Note/AN179; "Circuit Description of the NE564"; Philips Semiconductors; Dec. 1991; pp. 1–6.

Application Note/AN180; "Frequency synthesis with the NE564"; Philips Semiconductors; Dec. 1988; pp. 1–3.

Application Note/AN182; "Clock regenerator with crystal-controlled phase–locked loop VCO (NE564)"; Philips Semiconductors; Dec. 1991; pp. 1–10.

"Gateway 2000 Sells Destination Big Screen PC Through Retail Chains"; Internet article; Aug. 20, 1996; pp. 1–4.

"Gateway 2000 Launches Destination Big Screen PC Featuring 31–inch Monitor"; Internet article; Mar. 21, 1996; pp. 1–5.

"The Big–Tube PCTV"; PC Online/Trends Online; May 28, 1996; pp. 1–3.

"Destination Features"; Internet article; Aug. 21, 1996; pp. 1–5.

"Telefuzion"; Internet article; Mar. 12, 1997; pp. 1–2.

"High–Tech; Now you can tune your TV to the Internet"; Mike Snider; USA Today; Sep. 18, 1996; pp. 1–2.

Advanced Power Management (APM); Bios Interface Specification; Revision 1.1; Sep. 1993, pp. 1–59.

Phase–locked loop; NE/SE54/ Philips Semiconductors; Aug. 31, 1994; pp. 1–9.

*Primary Examiner*—Meng-Ai T. An
*Assistant Examiner*—Stacy Whitmore
*Attorney, Agent, or Firm*—Jenkens & Gilchrist P.C.

[57] ABSTRACT

Auto run apparatus, and an associated method, selectively permits execution of an auto run CD received at a CD ROM drive of a convergent device. When the auto run CD is received at the CD ROM drive, the operational mode of the convergent device is transferred to a computer mode. Thereafter, automatic execution of the CD is permitted.

15 Claims, 3 Drawing Sheets

AUTO RUN APPARATUS, AND ASSOCIATED METHOD, FOR A CONVERGENT DEVICE

BACKGROUND OF THE INVENTION

1. Field of the Invention

The present invention relates generally to a convergence or convergent device selectably operable in a computer mode and at least one convergent function mode. More particularly, the present invention relates to an auto run apparatus, and an associated method, for selectively executing a program resident upon storage media positionable at a media drive of the convergent device.

Execution of a program resident upon storage media containing auto run command files, such as an auto run file, when received at the media drive is selectively permitted. The mode in which the convergent device is operated is selected to be the computer mode prior to permitting execution of the program. Thereby, execution of the program is effectuated when the convergent device is operated in the computer mode rather than another convergent function mode.

When the convergence device is formed, for example, of a television converged into a computer, execution of the program resident upon the storage media is permitted only after the operational mode of the convergence device is selected to be the computer mode. Execution of the program while the convergence device is still in the television mode is thereby avoided.

2. Description of the Related Art

Many types of computer-based devices have achieved wide levels of utilization as a result of technological advancements which have improved the capabilities of such devices while, at the same time, also permitting the costs of such devices to be, in many instances, substantially reduced. Additional technological advancements shall likely permit yet more types of computer-based devices to be developed and commercialized.

Advancements in communication technologies have similarly permitted the development and implementation of many new types of, and many improvements to existing types of, communication devices. Additional technological advancements shall likely permit the introduction and commercialization of yet additional types of communication devices and improvements thereto.

Concomitant with such technological advancements is a convergence of technologies. Many new computer-based devices are permitted as a result of improvements in communication technologies and many new types of communication devices are permitted as a result of advancements in computer-based technologies.

A television convergent with a personal computer is exemplary of a device which has been developed utilizing advancements in computer-based technologies and communication technologies. Such a device includes the functionality of both a television and also that of a computer. More than a mere combination of the two devices is formed. Rather, synergistic functionality and features are permitted in such a device which would not otherwise be available in separate, discrete devices.

Conventional, commercially-available computers sometimes include one or more media drives capable of receiving storage media. A CD ROM drive for receiving a CD ROM is exemplary of such a media drive. At least one computer operating system, the Windows '95™ operating system, includes special provisions regarding execution of programs resident upon a CD ROM. Namely, the system can be configured to cause automatic execution of a program resident upon a CD ROM received by a CD ROM drive. An auto run file is stored together with the program resident upon the CD ROM. Detection of such a file initiates automatic execution of the program.

While the program is caused to be automatically executed by the operating system, when the operating system is embodied in a convergent device, such as the above-mentioned television convergent into a personal computer, the automatic execution of the program might not be appropriate. More particularly, if the convergent device is being operated in the television mode when the CD ROM is received at the CD ROM drive, the operating system would initiate automatic execution of the program resident thereon. Such automatic execution results in the concurrent execution of the program and operation of the convergent device in the television mode. Execution of the program while in the television mode might be undesirable.

Additionally, the existing operating system which automatically executes such a program, executes continuous polling which can result in interference with, for example, data capture. And, automatic execution of the program might permit unauthorized users to execute the program.

A manner by which to control the execution of a program resident upon storage media received at a media drive of a convergent device would therefore be advantageous.

It is in light of this background information related to convergent devices that the significant improvements of the present invention have evolved.

SUMMARY OF THE INVENTION

The present invention, accordingly, advantageously provides auto run apparatus, and an associate method, for selectively executing a program resident upon storage media positionable at a media drive of a convergent device. When storage media is received at the media drive which contains an auto run command file, operation of the convergent device is selected to be in the computer mode prior to initiation of execution of the program resident upon the storage media.

In one aspect of the present invention, a television convergent with a personal computer is provided. An operating system, such as a Windows '95™ operating system controls computer functioning of the convergent device. The operating system is operable to detect an auto run command file which provides for the automatic execution of a program associated therewith. The mode in the which the convergent device is operated is selected to be the computer mode prior to permitting execution of the program. Execution of the program is thereby effectuated when the convergent device is operated in the computer mode rather than the television mode.

In another aspect of the present invention, the media drive includes a media drive door which is positioned in an open position when storage media is received at the media drive. Polling to detect the presence of the storage media at the media drive is performed when the media drive door is opened and for up to a selected period of time thereafter. Continuous polling to detect the presence of storage media at the media drive which might otherwise interfere with operation of the convergent device is avoided. After the selected time period has timed-out, the media drive door is closed.

In another aspect of the present invention, the authority of a user to run the program is authenticated prior to permitting the convergent device to be operated in the computer mode. Authentication is provided, for example, by requiring the user to enter a PIN (personal identification number) prior to transferring the operational mode of the convergent device.

In another aspect of the present invention, the convergent device includes a CD ROM drive for receiving a CD ROM. When a determination is made that a program resident upon a CD ROM does not have associated therewith an auto run file, such as a music CD, automatic playing of the CD is still permitted without changing the operational mode of the convergent device. Playing of the CD is effectuated by the actuation of a transport key, such as a forward, reverse, or play button of a user interface.

Thereby, through operation of an embodiment of the present invention, when a CD ROM is received at a CD ROM drive of the convergent device, switching to a computer mode is selectively performed prior to running of the CD rather than immediately subsequent to insertion of the CD ROM at the CD ROM drive. Mere insertion of the CD ROM into the CD ROM drive which might otherwise interrupt execution or other performance of other programs already running at the convergent device, such as a television show or, e.g., Microsoft Word™, does not immediately cause execution of the program on the CD ROM. The mode in which the convergent device is operated is switched to a computer mode to ensure that the convergent device is operable in the correct context before initiating execution of the program.

In these and other aspects, therefore, auto run apparatus, and an associated method, selectively executes a program resident upon storage media positionable at a media drive coupled to a convergent device. The media drive has a media door positionable in an open position. The convergent device is operable in a computer mode and at least one convergent function mode. A presence determiner is positioned to determine when the storage media is positioned at the media drive. The presence determiner is operable at least for a selected period subsequent to positioning of the media door in an open position. A selector is operable responsive to determinations of the presence determiner of positioning of the storage media at the media drive. The selector selects operation of the convergent device in the computer mode and selectively permits execution of the program resident upon the storage media when the convergent device is in the computer mode.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE INVENTION

Figure 1:
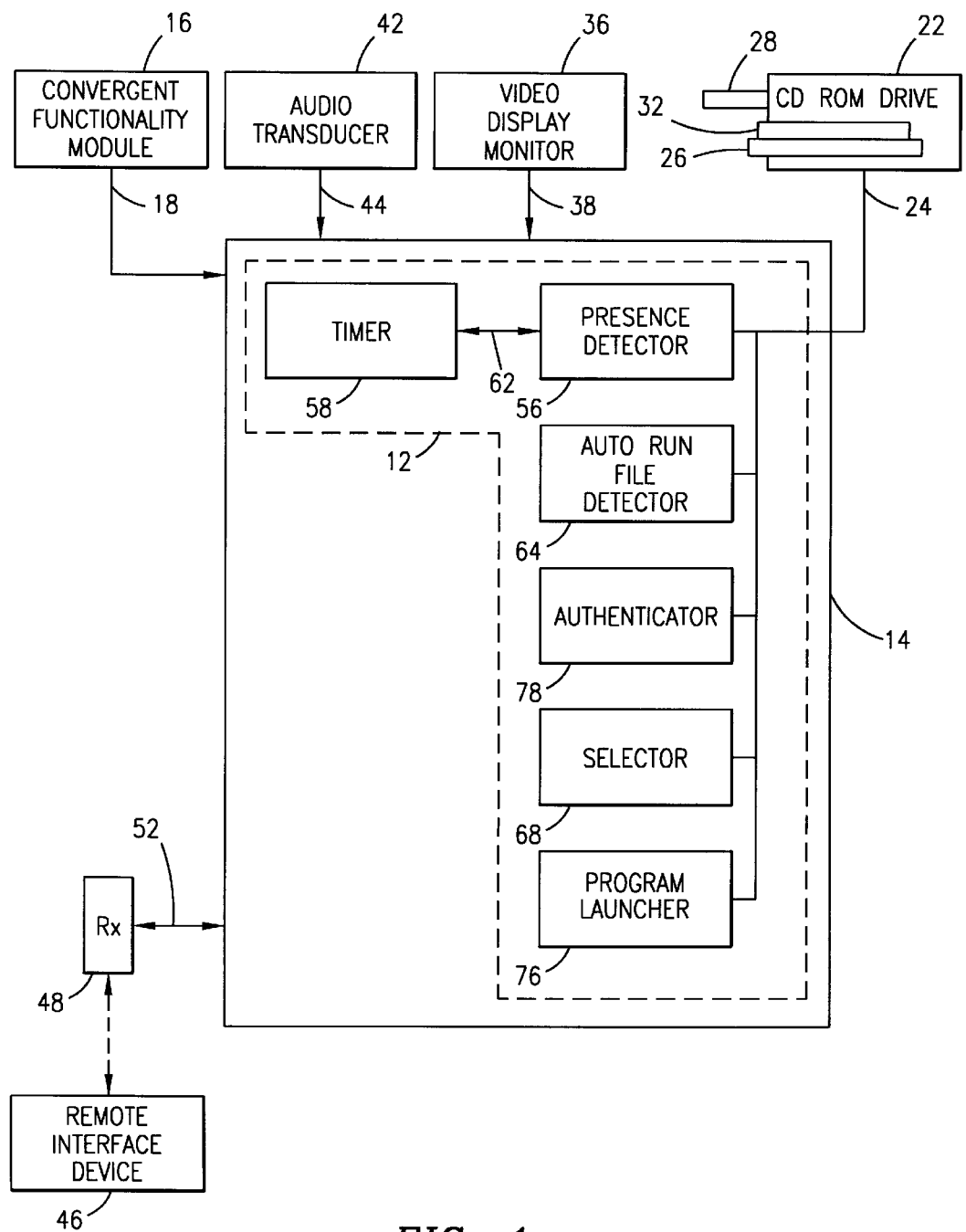
FIG. 1 illustrates a functional block diagram of a convergent device in which an embodiment of the present invention is operable.

Referring first to FIG. 1, a convergent device, shown generally at 10, includes the auto run apparatus 12 of an embodiment of the present invention. The convergent device 10 shall be described below with respect to an exemplary embodiment in which the convergent device is formed of a television convergent into a computer device. It should be understood at the outset, however, that the convergent device 10 can similarly represent other types of convergent devices and that the auto run apparatus 12 can similarly form a portion of such other convergent devices.

The convergent device 10 here includes a personal computer 14 operable to perform computer functions through operation of processor-based circuitry (not separately shown). The convergent device 10 also includes a convergent functionality module 16 which, in the exemplary embodiment, provides tele-video functions. The convergent functionality module 16 is here functionally coupled to the personal computer 14 by way of the line 18. The convergent functionality module 16 is here operable to provide tele-video functions. In one embodiment, the module 16 is formed of a television circuit card which is plugged into a computer backplane of the personal computer 14.

The convergent device 10 further includes a media drive, here a CD ROM drive 22 coupled to the personal computer 14 by way of the line 24. The CD ROM drive 22 includes a media platform 26 having a media drive door 28 positionable in an open position to permit insertion of a CD ROM 32 to be received at the CD ROM drive 22. The media drive door 28 is illustrated in the figure to be in the open position. Indications of the position of the media drive door 28 are provided by way of the line 24 to the personal computer 14.

The personal computer 14 is further coupled to a video display monitor 36 by way of the line 38. Video images generated during operation of the convergent device 10 are displayed upon the video display monitor 36. Analogously, the personal computer 14 is further coupled to an audio transducer 42 by way of the line 44. The audio transducer 42 is operable to generate audio signals generated during operation of the convergent device 10.

The convergent device 10 further includes an assembly for permitting a user of the convergent device to generate input signals, inter alia, to control operation of the convergent device. The assembly is here formed of a remote interface device 46 capable of generating infrared signals for transmission to an infrared receiver 48 coupled to the personal computer 14 by way of the line 52. The remote interface device 46, in one embodiment, is formed of an IR keyboard. Actuation keys formed on the actuation keyboard include transport keys (not separately shown) whose actuation provide control signals to control operation of the CD ROM drive 22 such as when the CD ROM 32 received at the CD ROM drive 22 is formed of, e.g., a music CD. Actuation of other keys of the keyboard forming the remote interface device 46 are determinative of other operational features of the convergent device 10.

For instance, control signals generated by the remote interface device 46 responsive to user actuation of selected keys of the actuation keyboard thereof determine the operational mode in which the convergent device 10 is operated. The convergent device 10 is operable in a television mode wherein tele-video or other television functions are provided by the convergent device and in a computer mode in which computer functions are provided by the convergent device.

Functional elements of the auto run apparatus 12 are further illustrated in the figure. In one embodiment, at least portions of such functional elements are executable by the circuitry of the personal computer 14. Such elements include a presence detector 56 which is coupled to the CD ROM drive 22 by way of the line 24. A timer 58 is coupled to the presence detector 56 by way of the line 62. The presence detector 56 is operable responsive to opening of the media drive door 28 to detect the presence of a compact disc 32 at the CD ROM drive 22. Polling to detect the presence of the CD ROM 32 at the drive 22 continues for a selected period, such period determined by the timer 58. If the CD ROM 32 is not detected by the presence detector 56 within the time period before which the timer 58 times out, the media drive door 28 is caused to close as a determination is made that the CD ROM 32 is not positioned at the CD drive.

If, however, the CD ROM 32 is detected at the CD ROM drive 22, an auto run file detector 64, also coupled to the CD ROM drive 22 by way of the line 24, is operable to detect whether a program resident upon the CD ROM 32 has an auto run file associated therewith. That is to say, the auto run file detector 64 is operable to determine whether the CD ROM 32 is an auto run CD ROM. The presence detector 56 and the auto run file detector 64 are coupled to the selector by way of the lines 66. The selector 68 is operable to select the mode of operation in which the convergent device 10 is operable. If the convergent device is being operated in the television mode when the CD ROM 32 is detected at the CD ROM drive 22, and an auto run file is detected by the detector 64, program execution of the program resident on the CD ROM 32 does not immediately occur. Rather, the selector 68 causes the operational mode of the convergent device 10 to be switched such that the convergent device 10 becomes operable in the computer mode. Once the convergent device 10 is operable in the computer mode, a program launcher 72, also forming a portion of the auto run apparatus 12, launches execution of the program.

Thereby, program execution, which would otherwise be initiated immediately upon detection of the auto run CD ROM, is instead delayed until the operational mode of the convergent device 10 is selected to be that of the computer mode. And, because the presence detector 56 detects for the presence of the CD ROM 32 only for a selected period subsequent to opening of the media drive door 28, continuous polling of the CD ROM drive 22 is not necessitated.

In the illustrated embodiment, the auto run apparatus 12 further includes an authenticator 78. The authenticator 78 is operable to authenticate the authority of a user of the convergent device to execute the program resident upon the CD ROM 32. Prior to permitting the program launcher 76 to launch execution of the program, the user's authority to execute the program is first authenticated. Such authentication procedure, in one embodiment, is carried out by requiring the user to input, by way of the remote interface device 46, a PIN (personal identification number) and comparing the entered PIN with a PIN stored at the authenticator 78.

Figure 2:
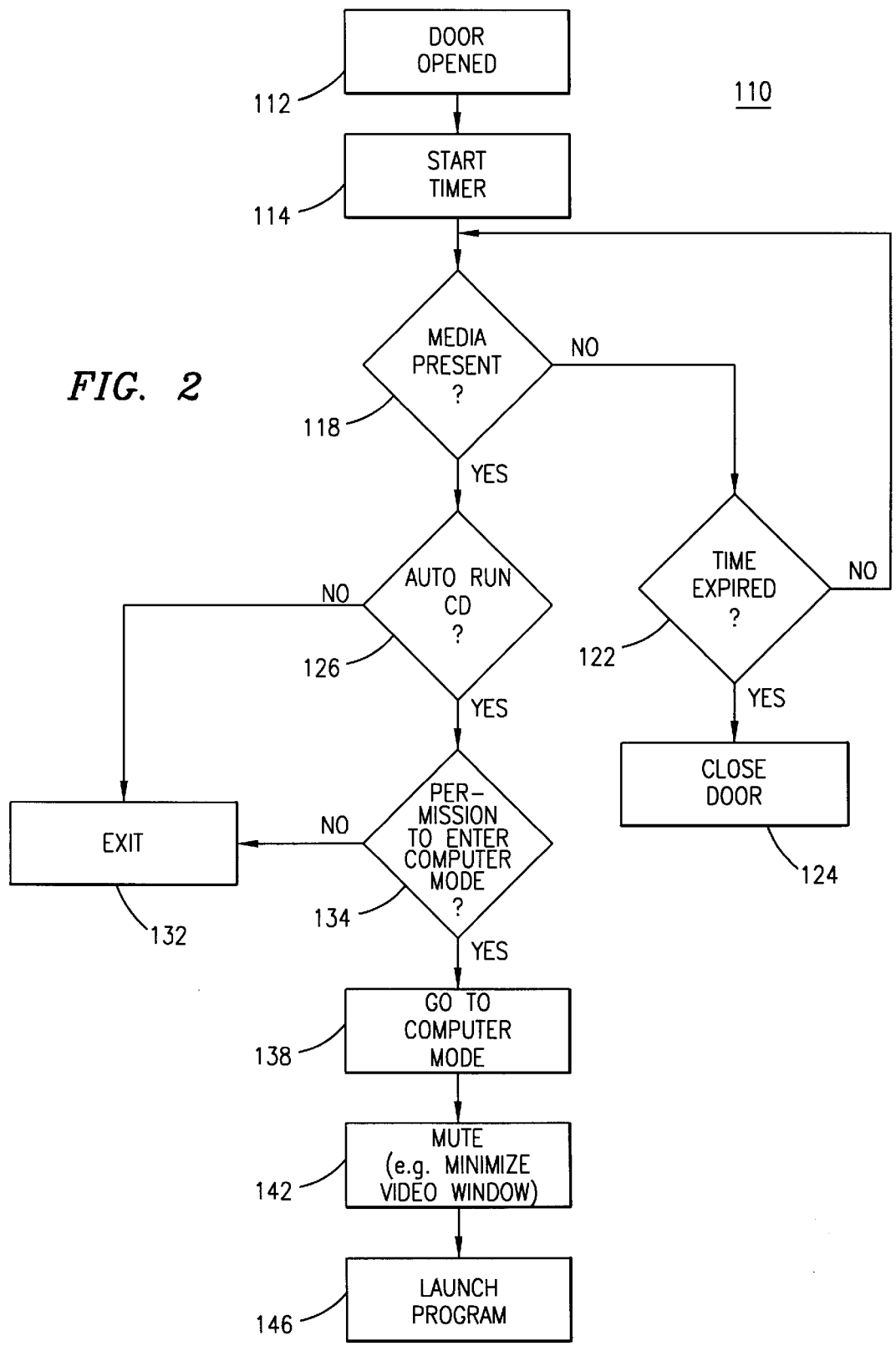
FIG. 2 illustrates a method flow diagram listing the method steps of the method of an embodiment of the present invention.

Turning next to FIG. 2, a method, shown generally at 110, illustrates the method of operation of an embodiment of the present invention to selectively initiate program execution of a program resident upon a CD ROM, such as the CD ROM 32 shown in FIG. 1. First, and as indicated by the block 112, the media drive door 28 of the CD ROM drive 22 is opened. Once the door is opened, timing of the timer 58 is started. In one embodiment, the timer period is of a thirty second duration.

Then, and as indicated by the decision block 118, a determination is made by the presence detector 56 as to whether the CD ROM 32 is received at the CD ROM drive 22. If a CD ROM is not received at the drive 22, the no branch is taken from the decision block 118 to the decision block 122. At the decision block 122, a determination is made as to whether the timer 58 has timed-out. If not, the no branch is taken back to the decision block 118. If, however, the timer has timed-out, the yes branch is taken from the decision block 122 to the block 124 and the media drive door 28 is closed. Continued polling of the drive 22 to detect for the presence of a CD ROM thereat is discontinued. Cycling between the decision blocks 118 and 122 continues until a CD ROM is detected at the CD ROM drive 22 or the timer times out.

If a CD ROM is detected at the drive 22 prior to timing-out of the timer, the yes branch is taken from the decision block 118 to the decision block 124. A determination is made at the decision block 124 as to whether the CD ROM positioned at the drive 22 is an auto run CD. If not, the no branch is taken to the exit block 132. If the CD ROM is not an auto run CD, program execution of a program resident upon the CD ROM is not automatically executed.

If, conversely, the CD positioned at the drive 22 is determined by the auto run file detector 64 to be an auto run CD, the yes branch is taken to the block 134. A determination is made at the block 134 as to whether the operational mode of the convergent device 10 is permitted to be in the computer mode. Such a determination is made, for instance, by operation of the authenticator 78, operable to authenticate authorization of a user of the convergent device 10 to execute programs thereat. If permission is not granted to enter into the computer mode of operation, the no branch is taken to the exit block 132, and the program is not executed. If, conversely, permission is granted to enter into the computer mode of operation, the yes branch is taken to the block 136. Thereat the convergent device enters into the computer mode of operation. Then, and as indicated by the block 142, in an embodiment in which the computer mode is a Windows™ environment, a video window displayed upon the video display monitor 36 is mininized. The purpose of minimizing the video window is to mute the video and audio generated by operation of the television. Then, and as indicated by the block 146, the program resident upon the CD ROM is launched by the program launcher 76.

Thereby, automatic execution of the program resident upon the CD ROM is permitted subsequent to grant of permission to enter into the computer mode and entry of the convergent device into the computer mode.

Figure 3:
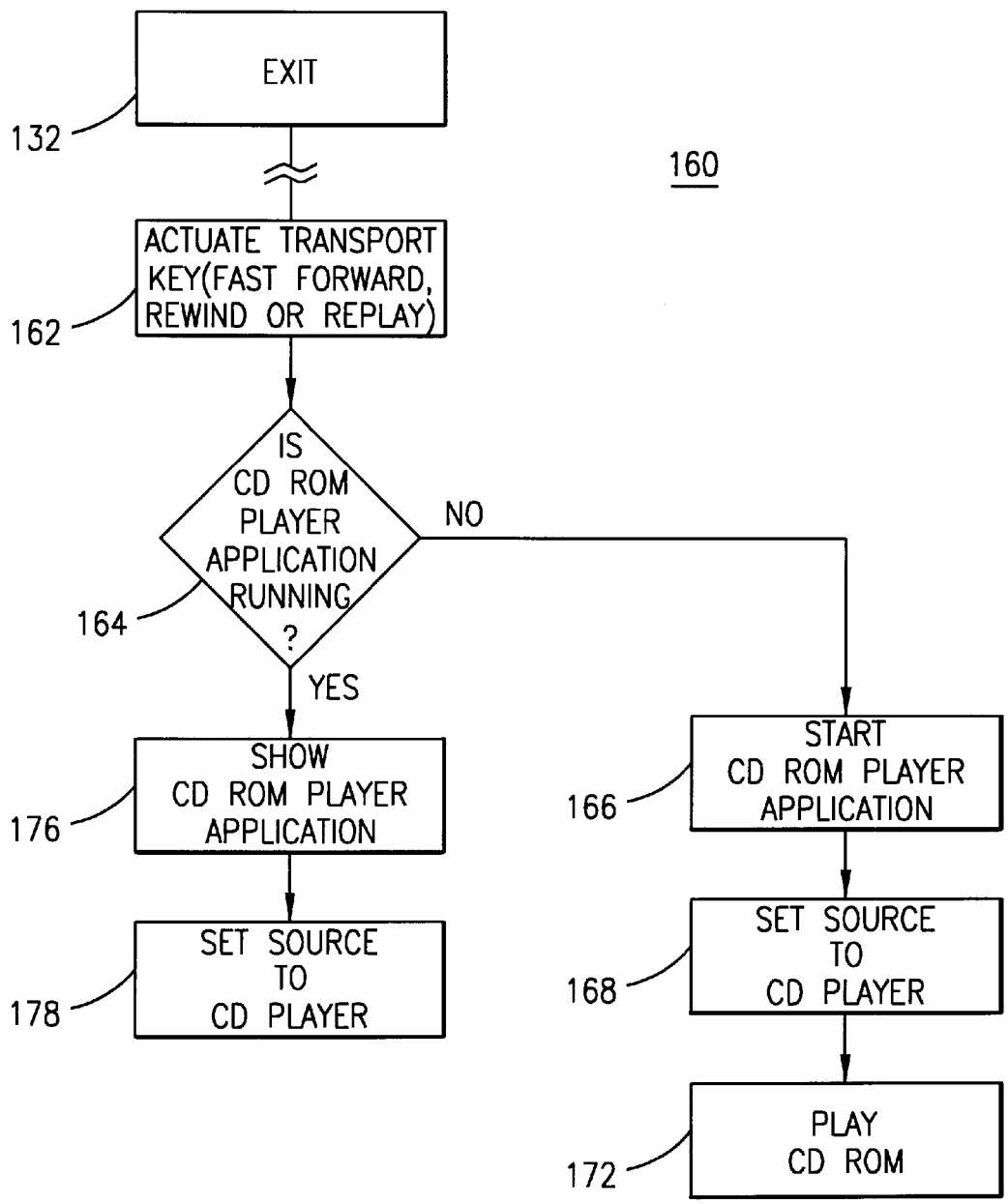
FIG. 3 illustrates a method flow diagram listing the method steps of the method of another embodiment of the present invention.

FIG. 3 illustrates a method, shown generally at 160, of an embodiment of the present invention which permits automatic playing of an audio CD ROM, received at the CD ROM drive, here forming a CD ROM player application 22. An audio CD ROM is of a type other than an auto run CD. The exit block 132, shown previously in FIG. 2, is again illustrated in FIG. 3 as a branch is taken to the exit block 132 during operation of the method 110 if the CD ROM received at the drive 22 is not an auto run CD.

First, and as indicated by the block 162, if the audio CD ROM is to be played, such as to play a music CD, the user of the convergent device 10 actuates a transport key, such as an appropriate transport key on the remote interface device 46. Exemplary transport keys include a fast forward, play, and reverse keys.

Then, and as indicated by the decision block 164, a determination is made as to whether the CD ROM player application 22 is running. If the CD ROM player application 22 is not running, the no branch is taken to the block 166 and the CD ROM player application 22 is started. Then, and as indicated by the block 168, the source CD player application is set so that signals generated during the playing of the CD ROM are transduced by the audio transducer 42 of the convergent device. Then, and as indicated by the block 172, the CD is played.

If, at the decision block 164, a determination is made that the CD ROM player application 22 is running, the yes branch is taken to the block 176 whereat the video display monitor 36 is commanded to display a CD player application, such as that which is displayed when the personal computer 14 is operable in a Windows™ environment. Then, and as indicated by the block 178, similar to the block 168, the source is set to the CD player application so that signals generated during operation of the CD ROM player application are transduced by the audio transducer 42.

Thereby, through operation of an embodiment of the present invention, the convergent device 10 is caused to be operated in the computer mode prior to automatic execution of an auto CD ROM. Because polling to detect the presence of a CD ROM at a CD ROM player application is performed only a limited periods, operation of an embodiment of the present invention is less likely to cause interference with other operations of the convergent device 10.

The previous descriptions are of preferred examples for implementing the invention, and the scope of the invention should not necessarily be limited by this description. The scope of the present invention is defined by the following claims.

What is claimed is:

1. An auto run apparatus for selectively executing a program resident upon storage media positionable at a media drive having a media door, the media drive forming a portion of a convergent device that comprises a television convergent into a personal computer, and wherein the convergent device is operable in a computer mode and at least one convergent function mode including a television mode, said auto run apparatus comprising:
    a presence determiner positioned to determine when the storage media is positioned at the media drive, said presence determiner operable at least for a selected period subsequent to positioning of the media door in a first position; and
    a selector operable responsive to determinations of said presence determiner of positioning of the storage media at the media drive, said selector for selecting operation of the convergent device in the computer mode and for selectively permitting execution of the program resident upon the storage media when the convergent device is in the computer mode and wherein, when said selector selects operation of the convergent device in the computer mode, at least audio functioning of the television mode is muted.

2. The auto run apparatus of claim 1 wherein said presence determiner further comprises a timer, said timer for timing the selected period subsequent to positioning of the media door in the first position during which said presence determiner is operable.

3. The auto run apparatus of claim 1 wherein the storage media comprises a CD ROM, the media drive comprises a CD ROM drive, the first position of the media door is an open position, and said presence determiner determines whether the CD ROM is inserted into the CD ROM drive within a selected period subsequent to opening of the media door of the CD ROM drive into the open position.

4. The auto run apparatus of claim 3 further comprising an auto run detector operable responsive to the determinations of the presence determiner of the positioning of the CD ROM at the CD ROM drive, said auto run detector for detecting whether the program resident upon the CD ROM positioned at the CD ROM drive comprises an auto run file, the auto run file causing automatic execution of the program.

5. The auto run apparatus of claim 4 wherein said selector is operable when both said presence determiner determines the CD ROM to be positioned at the CD ROM drive and said auto run detector detects the program resident upon the CD ROM to include the auto run file.

6. The auto run apparatus of claim 4 wherein the convergent device further comprises a user interface having at least one transport key, the transport key, when actuated for initiating transporting movement of the CD ROM by the CD ROM drive, and wherein, if said auto run detector fails to detect the auto run file, and the transport key is actuated, said selector permits execution of the program resident upon the CD ROM.

7. The auto run apparatus of claim 6 wherein the convergent device further comprises an output device and wherein the program resident upon the CD ROM comprises a program which, when read, appears in human perceptible form upon the output device.

8. The auto run apparatus of claim 1 wherein said selector further authenticates authorization to execute the program resident upon the storage media.

9. The auto run apparatus of claim 8 wherein the convergent device further comprises a user input device at least for permitting a user to input an authorization code therethrough and wherein said selector authenticates the authorization to execute the program responsive to values of the authorization code entered through the user input device.

10. The auto run apparatus of claim 1 further comprising a program launcher operable when said selector permits execution of the program resident upon the storage media, said program launcher for launching execution of the program.

11. A method for selectively executing a program resident upon storage media, the storage media positionable at a media drive having a media door, the media drive forming a portion of a convergent device that comprises a television convergent into a personal computer, and wherein the convergent device is operable in a computer mode and at least one convergent function mode including a television mode, said method comprising the steps of:
    determining, during a selected period subsequent to positioning of the media door in a first position, when the storage media is positioned at the media drive;
    selecting operation of the convergent device in the computer mode responsive to a determination during said step of determining of positioning of the media drive at the media drive, such that at least audio functioning of the television mode is muted; and
    selectively permitting execution of the program resident upon the storage media once the convergent device is selected to be operable in the computer mode.

12. The method of claim 11 wherein the storage media comprises a CD ROM, the media drive comprises a CD ROM drive, the first position of the media door is an open position, and said step of determining comprises determining whether the CD ROM is inserted in the CD ROM drive within a selected period subsequent to opening of the media door of the CD ROM drive into the open position.

13. The method of claim 12 comprising the further step of detecting whether the program resident upon the CD ROM comprises an auto run file, the auto run causing automatic execution of the program.

14. The method of claim 13 wherein operation of the convergent device in the computer mode is selected during said step of selecting if both the CD ROM is determined during said step of determining to be positioned at the CD ROM drive and the auto run file is detected during said step of detecting to be resident upon the CD ROM.

15. A computer system comprising:

a computer processor selectably operable in a computer mode to perform computer processing;

a convergence functionality module coupled to said computer processor and converged therewith, said convergence functionality module selectably operable in a television mode to perform television functions;

a media drive having a media door and coupled to said computer processor, said media drive for receiving storage media having a program resident thereon;

a presence determiner positioned to determine when the storage media is positioned at the media drive, said presence determiner operable at least for a selected period subsequent to positioning of the media door in an open position; and a selector operable responsive to determinations of said presence determiner of positioning of the storage media at the media drive, said selector for selecting operation of the convergent device in the computer mode and for selectively permitting execution of the program resident upon the storage media when the convergent device is in the computer mode and wherein, when said selector selects operation of the convergent device in the computer mode, at least audio functioning of the television mode is muted.

* * * * *